Patented Dec. 23, 1941

2,266,954

UNITED STATES PATENT OFFICE 2,266,954

WETTING AGENT IN SETTLING OF ORE PULPS

Charles Frederic Bonnet, Monrovia, Calif., and Robert Ben Booth, Springdale, Conn., assignors to American Cyanamid Company, New York, N. Y., a corporation of Maine No Drawing. Application August 26, 1939, Serial No. 292,076

13 Claims. (Cl. 210—42.5)

The present invention relates to the concentration or separation of solid particles from aqueous dispersions or suspensions thereof, and more particularly to the settling of solids from ore pulps and ore slimes.

In the ore dressing art, various hydraulic methods are employed to effect concentration or separation of the solid ore materials. The differential separation or concentration processes may be those involving ore pulps or slimes containing mixtures of relatively large and relatively small ore particles or relatively heavy and relatively light partricles in which cases the concentration can be effected by gravity methods of separation with or without agitation. In other processes, the ore particles may be substantially of the same size and specific gravity or may be in such a fine state of division that the difference in specific gravity is balanced by other factors in which cases the concentration of the solids is usually effected by sedimentation or settlement from substantially stagnant aqueous suspensions. These sedimentation or settlement processes are usually carried out by introducing the ore pulps or slimes into suitable tanks and allowing them to remain therein for a sufficient period of time to permit the solid particles to settle to the lower portion of the tank. Batches of the ore pulps or slimes may be treated separately or the operations may be conducted in a continuous manner by continuously introducing the ore pulps or slimes into a suitable tank and continuously withdrawing the solids as they settle to the lower portion and continuously withdrawing the supernatant liquid from the upper portion of the tank.

In these gravity methods of concentration, the speed and efficiency with which separation is effected depend upon the rate at which the solid materials settle from the ore pulps and ore slimes. Therefore, a method that increases the rate of settlement will also improve the efficiency of the concentration or separation.

The present invention provides an improved method for increasing the speed and uniformity of settlement of the suspended solids in ore pulps and slimes and hence the efficiency of such operations. The terms "ore pulps" and "ore slimes" as employed herein refer to mixtures or suspensions in aqueous media of solid or material, concentrates, tailings, and the like. The solid ore particles of the pulps may range in size from extremely fine to rather coarse. The ore slimes are similar to the ore pulps but also have a slimy material present. The improved results of the present process are the most outstanding when the operations are carried out in connection with ore pulps and slimes in which the suspended solid particles are very finely divided. However, the present invention also produces improved results when the solid particles are comparatively large. Likewise, the most pronounced results are obtained when used in connection with the concentration of the suspended fines from relatively stagnant aqueous ore pulps and slimes. This invention can also be used to advantage in the concentration and separation of ores in the various other hydraulic treatments.

Various methods have been used in the past to change the character of the solid particles in the slimes or pulps in order to effect a more complete concentration and to speed up the rate of settling. Some of these methods add substances such as starch and soaps that cause the finely divided particles to coalesce or coagulate to form agglomerations of the finely divided particles which settle more rapidly than the individual particles. Other methods use substances such as calcium oxide or lime to change the pH of the suspensions and produce flocculating, thus speeding up the settling.

A more recent method is based on the use of improved soaps or modified soaps that have good detergent and emulsifying properties, such compounds being sulfonated fatty acids and sulfonated oils.

According to the present invention, we have found that improved results in the settling of the solids in ore pulps and slimes are obtained by adding small amounts of the synthetic type wetting agents such as the sulfated high molecular alcohols having five or more carbon atoms, sulfonated esters of higher alcohols and dibasic acids, and alkylated aryl sulfonates, as distinguished from the ordinary and modified soaps, sulfonated oils, and sulfonated fatty acids used in former methods. The synthetic type wetting agents of the present invention are primarily surface active compounds that have a much greater penetrating and wetting power than the soaps or modified soaps of the prior art which are primarily detergent and emulsifying agents.

While the present invention is not limited to any particular theory as to the mode of action, the improved results of the present invention may be due to the increased surface activity which causes the finely divided solid particles in the ore pulps and slimes to become more readily wetted, overcoming the buoyancy effect of the individual particles caused by the relatively large amount of surface exposed as compared to the density of the particles to such an extent that the wetted particles settle at a greater rate of speed than in pulps and slimes not using synthetic wetting agents.

We have obtained good results using quantities as small as 0.5 lb./ton of the synthetic type wetting agents such as sulfonated sulfo-succinic acid esters of alcohols having at least five carbon atoms, alkyl-naphthalene sulfonates and the sulfuric acid esters of aliphatic alcohols having at least five carbon atoms such as the sodium salt of sulfated oleyl alcohol and sodium lauryl sulfate. The wetting agents can be added to the ore pulps or slimes either at high solid density or after dilution to low solid density.

The wetting agents of the present invention have been shown to aid in tabling, jigging and other metallurgical operations as pointed out in the copending application, Serial No. 300,175, filed October 19, 1939. Therefore, it is an advantage of the present invention that settling operations following tabling or jigging concentration methods that have used the wetting agents of the present invention are also aided by the presence of such wetting agents.

The wetting agents of the present invention have also been found to increase the rate of settlement of the finely divided solid particles suspended in ore pulps and slimes when used in conjunction with coagulating and thickening agents such as starch as compared to methods using starch alone. Increased rates of settlement are also obtained when the wetting agents are used in conjunction with substances like lime as compared to the methods using lime alone.

The application of the process will be described in greater detail in conjunction with typical ore pulps and slimes as illustrated by the following examples.

EXAMPLE 1

A gold-silver ore from West Africa, containing manganese oxide slimes, limonite, magnetite, hematite, feldspar, and quartz, and assaying about 0.64 oz./ton Au, 24.5 oz./ton Ag, 10.34% Mn, 2.69% Fe, and 73.57% insoluble was ground to minus 65 mesh and about 68% minus 200 mesh. This ground pulp was then diluted to about 10% solids. Several samples of this diluted pulp, each containing about 125 g. of dry solids, were placed in 1000 cc. graduated cylinders, treated with various wetting agents, and then allowed to settle by gravity. The volume of clear liquid above the settling solids was noted at ten-minute intervals for a period of 100 minutes. In order to calculate the ultimate density of the settled solids, the pulp was then allowed to stand until no further settling was indicated in two consecutive twenty-four hour periods.

The results of tests with wetting agents were compared with those of a control test in which no wetting agents were used. The results of all tests are presented in the following table:

Table I

| Time | Vol. (cc.) of clear liquid above solids | | | | | |
|---|---|---|---|---|---|---|
| | No wetting agent | Sodium dioctyl-sulfo-succinate | Sodium isopropyl naphthalene sulfonate | Reaction product of oleic acid and 2-aminoethane sulfonic acid | Sodium lauryl sulfate | Sodium salt of a sulfated alcoholic ether, known to the trade as "Tergitol #7" |
| 0 minutes | 0 | 0 | 0 | 0 | 0 | 0 |
| 10 minutes | 210 | 245 | 232 | 225 | 235 | 235 |
| 20 minutes | 405 | 445 | 440 | 410 | 425 | 430 |
| 30 minutes | 585 | 612 | 605 | 575 | 595 | 600 |
| 40 minutes | 640 | 660 | 645 | 645 | 652 | 650 |
| 50 minutes | 655 | 675 | 660 | 662 | 670 | 665 |
| 60 minutes | 670 | 690 | 670 | 675 | 680 | 675 |
| 70 minutes | 680 | 695 | 680 | 685 | 690 | 685 |
| 80 minutes | 685 | 702 | 690 | 695 | 700 | 695 |
| 90 minutes | 695 | 710 | 695 | 700 | 705 | 700 |
| 100 minutes | 700 | 715 | 702 | 705 | 710 | 705 |
| 24 hours | 778 | 788 | 780 | 782 | 785 | 784 |
| 48 hours | 780 | 788 | 780 | 782 | 785 | 784 |
| Ultimate density percent solids | 41.6 | 42.7 | 41.6 | 41.9 | 42.3 | 42.2 |

The data in Table I indicate that the rate of settling was accelerated by the use of wetting agents. Also, it is indicated that the wetting agents tested did not exert an appreciable effect on the ultimate density of the settled solids.

EXAMPLE 2

In tests on a gold-silver ore from West Africa, also containing gold, silver, manganese oxide slimes, limonite, and quartz, and assaying about 0.54 oz./ton Au, 22.2 oz./ton Ag, 0.46% CaO, 54.92% $SiO_2$, 13.49% $Al_2O_3$, 6.17% Fe, and 9.21% $MnO_2$, a combination of 1.0 lb./ton potato starch and 0.15 lb./ton sodium dioctylsulfosuccinate increased the settling rate over that obtained with 1.0 lb./ton potato starch. The ore was ground to minus 65 mesh and about 79% minus 200 mesh and then treated as in the above-described settling tests. Data on these tests are summarized in Table II. The volume readings were taken at 30-minute intervals for 270 minutes.

Table II

| Time | Vol. (cc.) of clear liquid above solids | |
|---|---|---|
| | 1.0 lb./ton potato starch | 1.0 lb./ton potato starch 0.15 lb./ton sodium dioctylsulfo-succinate |
| 0 minutes | 0 | 0 |
| 30 minutes | 95 | 155 |
| 60 minutes | 142 | 205 |
| 90 minutes | 175 | 235 |
| 120 minutes | 205 | 260 |
| 150 minutes | 230 | 275 |
| 180 minutes | 250 | 290 |
| 210 minutes | 268 | 305 |
| 240 minutes | 282 | 315 |
| 270 minutes | 300 | 325 |
| 48 hours | 552 | 560 |
| 72 hours | 585 | 585 |

EXAMPLE 3

In tests on a gold ore from Arizona containing gold, quartz and iron oxides and assaying about 0.05 oz./ton Au, 4.07% Fe, 0.01% S, and 85.40% insoluble, a combination of 1.0 lb./ton CaO and 0.15 lb./ton sodium dioctylsulfosuccinate appeared to give an increased rate of settling over that obtained with 1.0 lb./ton CaO alone. This ore was ground to minus 48 mesh and about 52% minus 200 mesh and then treated as in the above-described settling tests. 300 g. (dry weight) were used in each test. The data obtained in these tests are presented in Table III. The volume readings were taken at thirty-minute intervals.

*Table III*

| Time | Vol. (cc.) of clear liquid above solids | |
|---|---|---|
| | 1.0 lb./ton CaO | 1.0 lb./ton CaO 0.15 lb./ton sodium dioctylsulfosuccinate |
| 0 minutes | 0 | 0 |
| 30 minutes | 140 | 135 |
| 60 minutes | 248 | 250 |
| 90 minutes | 310 | 330 |
| 120 minutes | 332 | 365 |
| 150 minutes | 350 | 385 |
| 180 minutes | 365 | 400 |
| 210 minutes | 375 | 410 |
| 240 minutes | 380 | 415 |
| 270 minutes | 390 | 420 |
| 300 minutes | 395 | 430 |
| 330 minutes | 400 | 435 |
| 24 hours | 485 | 510 |

The data in Tables II and III indicate that the combination of a wetting agent and a settling agent, such as lime or potato starch, accelerates the rate of settling over that obtained with the lime or starch alone.

What we claim is:

1. A method of settling solids from ore pulps which comprises treating the ore pulp with an effective amount of at least one of the wetting agents selected from the group sulfated high molecular alcohols, sulfonated esters of higher alcohols and dibasic acids, and alkylated aryl sulfonates, and allowing the finely divided solid particles to settle.

2. A method of settling solids from ore slimes which comprises treating the ore slime with an effective amount of at least one of the wetting agents selected from the group sulfated high molecular alcohols, sulfonated esters of higher alcohols and dibasic acids, and alkylated aryl sulfonates, and allowing the finely divided solid particles to settle.

3. A method of settling solids from ore pulps which comprises treating the ore pulp with an effective amount of a mixture of at least one of the wetting agents selected from the group sulfated high molecular alcohols, sulfonated esters of higher alcohols and dibasic acids and alkylated aryl sulfonates with starch, and allowing the finely divided solid particles to settle.

4. A method of settling solids from ore slimes which comprises treating the ore slime with an effective amount of a mixture of at least one of the wetting agents selected from the group sulfated high molecular alcohols, sulfonated esters of higher alcohols and dibasic acids and alkylated aryl sulfonates with starch, and allowing the finely divided solid particles to settle.

5. A method of settling solids from ore pulps which comprises treating the ore pulp with an effective amount of a wetting agent of the class sulfosuccinic acid esters of alcohols having at least five carbon atoms, and allowing the finely divided solid particles to settle.

6. A method of settling solids from ore pulps which comprises treating the ore pulp with an effective amount of a mixture of a wetting agent of the class sulfosuccinic acid esters of alcohols having at least five carbon atoms with starch, and allowing the finely divided solid particles to settle.

7. A method of settling solids from ore pulps which comprises treating the ore pulp with an effective amount of a wetting agent of the class alkyl naphthalene sulfonates, and allowing the finely divided solid particles to settle.

8. A method of settling solids from ore pulps which comprises treating the ore pulp with an effective amount of a mixture of a wetting agent of the class alkyl naphthalene sulfonates with starch, and allowing the finely divided solid particles to settle.

9. A method of settling solids from ore pulps which comprises treating the ore pulp with an effective amount of a wetting agent of the class sulfuric acid esters of aliphatic alcohols having at least five carbon atoms, and allowing the finely divided solid particles to settle.

10. A method of settling solids from ore pulps which comprises treating the ore pulp with an effective amount of sodium dioctylsulfosuccinate, and allowing the finely divided solid particles to settle.

11. A method of settling solids from ore pulps which comprises treating the ore pulp with an effective amount of a mixture of sodium dioctylsulfosuccinate with starch, and allowing the finely divided solid particles to settle.

12. A method of settling solids from ore pulps which comprises treating the ore pulp with an effective amount of sodium isopropylnaphthalene sulfonate, and allowing the finely divided solid particles to settle.

13. A method of settling solids from ore pulps which comprises treating the ore pulp with an effective amount of a mixture of sodium isopropylnaphthalene sulfonate with starch, and allowing the finely divided solid particles to settle.

CHARLES FREDERIC BONNET.
ROBERT BEN BOOTH.